(12) United States Patent
Hoover

(10) Patent No.: US 6,195,113 B1
(45) Date of Patent: *Feb. 27, 2001

(54) TWO POINT POWER CONTROL FOR DUAL LASER DIODES USING MICROPROCESSOR BASED CONTROLLERS

(75) Inventor: Martin E. Hoover, Rochester, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,559

(22) Filed: Jan. 31, 1997

(51) Int. Cl.[7] ....................................................... B41J 2/47
(52) U.S. Cl. ........................... 347/235; 347/250; 359/204
(58) Field of Search .................................... 347/233, 235, 347/236, 238, 246, 250, 225, 130, 132; 250/205; 359/204, 900, 212, 213, 214, 219; 358/296, 300; 355/210

(56) References Cited

U.S. PATENT DOCUMENTS

| 4,916,530 | * | 4/1990 | Neilson et al. | 358/75 |
| 5,208,796 | | 5/1993 | Wong et al. | 369/97 |
| 5,381,165 | | 1/1995 | Lofthus et al. | 346/108 |
| 5,579,328 | * | 11/1996 | Habel et al. | 372/31 |
| 5,671,078 | * | 9/1997 | Mirchandani | 347/246 |

* cited by examiner

Primary Examiner—N. Le
Assistant Examiner—Lamson D. Nguyen

(57) ABSTRACT

A method for digitally controlling power from dual laser diodes in a system that forms a plurality of scan lines in a transverse direction across the width of a photosensitive member by reflecting modulated beams from a plurality of facets of a rotating polygon by detecting the beginning of a scan line and providing a start of scan (SOS) signal representing the detection. Power is digitally controlled from the laser diodes by controlling the power from each of the laser diodes for video ON exposure control and controlling the power from each of the laser diodes for video OFF bias control in order for the bias control to enable constant exposure power during SOS detection.

31 Claims, 9 Drawing Sheets

TWO POINT POWER CONTROL FOR DUAL LASER DIODES USING MICROPROCESSOR BASED CONTROLLERS

BACKGROUND AND MATERIAL DISCLOSURE STATEMENT

This invention relates generally to a raster output scanning system for producing a high intensity imaging beam which scans across a rotating polygon to a movable photoconductive member to record electrostatic latent images thereon, and, more particularly, to two point power control implemented by a microprocessor to digitally control the power from dual laser diodes.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e., line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper.

A difficulty in the past, however, is that prior art techniques in power control of laser diodes has been done with thermoelectric (TE) coolers that regulate the temperature of the laser to minimize power variation. These (TE) coolers are expensive, bulky in size, and very inefficient to operate. More recent methods employ analog power controls which become increasingly difficult to implement when controlling the newest technology lasers with multiple beams in the same package. When using a dual laser diode for simultaneous imaging, it is very important to balance the power of the two beams to provide uniform exposure. In addition, in prior art machines, exposure control has often been set by a control knob implemented with analog signal wires sensitive to noise.

Thus it would be desirable to provide a power system control that overcomes many of these difficulties in the prior art. It is therefore an object of the present invention to overcome not only changing characteristics due to temperature, but also differences between dual lasers in providing the necessary power balance. It is another object of the present invention to provide a microprocessor based digital control with embedded intelligence and diagnostic capability in controlling laser power. Another object of the present invention is to vary exposure setpoints by serial download of digital information including functional parameter data such as control loop compensation data. Other advantages of the present invention will become apparent as the following description proceeds, and the features characterizing the invention will be pointed out with particularity in the claims annexed to and forming a part of this specification.

SUMMARY OF THE INVENTION

This invention is a two point power control method implemented by a microprocessor to digitally control the power from a dual laser diode within a Raster Output Scanner (ROS) imager sub-system. The exposure power of each of two lasers is controlled for both the video ON exposure (Level) and the video OFF background (Bias) In particular, two different points on the laser diode characteristic curve are measured and each laser is controlled with two control loops, one for Bias and one for Level. The Bias control is done by indirect sensing method which also enables constant exposure power during Start Of Scan (SOS) detection. The Level control regulates the ON power for each of two beams to provide dual beam power balance with variable exposure as set by serial downloaded data.

For a better understanding of the present invention, reference may be had to the accompanying drawings wherein the same reference numerals have been applied to like parts and wherein:

DESCRIPTION OF THE INVENTION

Figure 1:
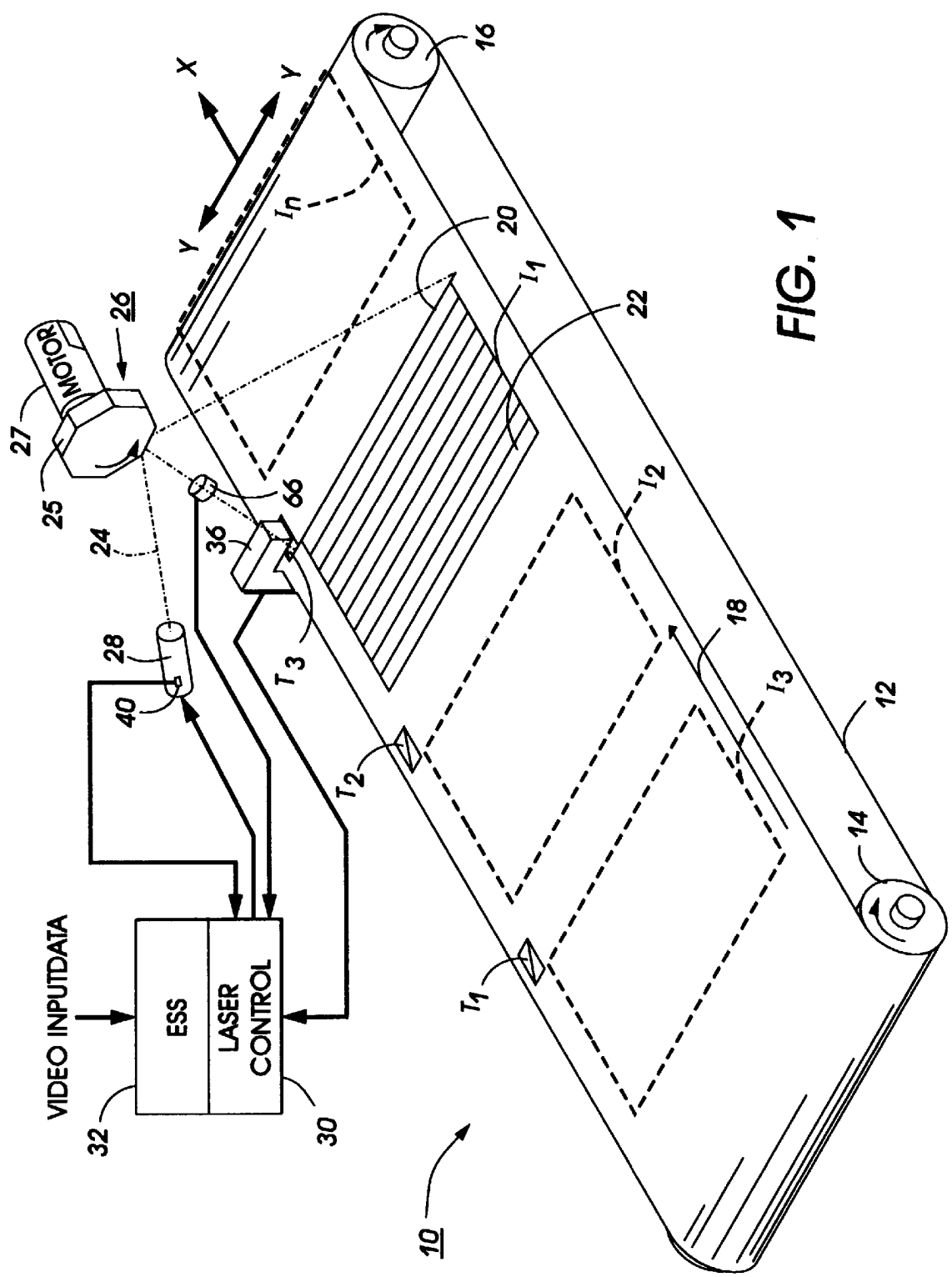
FIG. 1 illustrates a typical ROS printing system incorporating dual beam laser power control in accordance with the present invention.

In FIG. 1 of the drawings, an embodiment of the present invention is incorporated in a multi-pass xerographic printing system depicted schematically and designated generally by reference numeral 10. The system 10 includes a photoreceptive belt entrained about guide rollers 14 and 16, at least one of which is driven to advance the belt 12 in a longitudinal direction of processing travel depicted by the arrow 18. The length of the belt 12 is designed to accept an integral number of spaced image areas $I_1\text{-}I_n$ represented by dashed line rectangles in FIG. 1. As each of the image areas $I_1\text{-}I_n$ reaches a transverse line of scan, represented at 20, it is progressively exposed on closely spaced transverse raster lines 22 shown with exaggerated longitudinal spacing on the image area $I_1$ in FIG. 1.

In the embodiment depicted in FIG. 1, the line 20 is scanned by a raster output scanner so that a modulated laser beam 24 is reflected to the line 20 by successive facets 25 on a rotatable polygon-shaped mirror 26 driven by motor 27 providing suitable feedback signals to control 30. The beam 24, illustrated in dotted lines is actually two beams, emitted by a laser device 28 such as a dual beam laser diode, operated by a laser drive module and power control forming part of a control processor generally designated by the reference numeral 30. The processor 30 includes other not shown circuit or logic modules such as a scanner drive command circuit, by which operation of motor 27 for rotating the polygon mirror 26 is controlled. A start of scan(SOS) sensor, illustrated at 66 determines a start of scan reference point and also provides suitable feedback signals to control 30. In addition, a laser power sensor 40, also referred to as a back facet photodiode, senses a portion of the power of laser 28 to convey a power reading to control 30.

In the operation of the system 10, as thus far described, the control 30 responds to a video signal to expose each raster line 22 to a linear segment of the video signal image. In xerographic color systems, each image area $I_1 I_n$, must be exposed in the same manner to four successive exposures, one for each of the three basic colors and black. In a multi-pass system such as the system 10, where only one raster output scanner or head is used, complete exposure of each image area requires four revolutions of the belt 12. It should also be noted that the present invention is equally applicable to black and white exposure systems.

The image areas $I_1 I_n$ are successively exposed on successive raster lines 22 as each raster line registers with a transverse scan line 20 as a result of longitudinal movement of the belt 12. It is to be noted that the length of the transverse scan line 20 in system 10 is longer than the transverse dimension of the image areas I. Scan line length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scan line may be shifted in a transverse direction by control of the laser drive module and the transverse position of the exposed raster lines 22, and image areas $I_1 I_n$, shifted in relation to the belt 12.

Downstream from the exposure station, a development station (not shown) develops the latent image formed in the preceding image area. After the last color exposure, a fully developed color image is then transferred to an output sheet. An electronic Sub System (ESS) 32 contains the circuit and logic modules which respond to input video data signals and other control and timing signals, to drive the photoreceptor belt 17 synchronously with the image exposure and to control the rotation of the polygon by the motor. For further details, reference is made to U.S. Pat. Nos. 5,381,165 and 5,208,796 incorporated herein. As illustrated any suitable marker on the photoconductive surface or belt or any suitable hole such as T1, T2, and T3 provides a reference for each projected image on the belt surface.

In accordance with the present invention, a microprocessor controls a pair of dual beam lasers with a total of 4 control loops in a shared time slot multiplexed mode. There are two control loops per dual beam laser, a Bias and a Level Control loop. The same microcontroller is also shared with the Motor Polygon Assembly (MPA) speed control and all sub-system applications such as softstart ramping of lasers and diagnostics of laser failures with controlled ROS shutdowns. The microcontroller generates SAMPLE timing, logic sequencing of video overrides and Level control loop selections ONE ON, BEAM SELECT, HIGH, LOW in order to acquire the sampled power data for each of the four power control loops. A power sample is taken between each scan line during the rescan time (time laser jumps to next facet on polygon). This critical one sample per scan timing is generated by high speed capture and compare event timing also done by the microcontroller internally to implement an independent stand alone sub-system operation with simplified video interface that has been reduced to two channel video inputs and SOS pulse output.

The Bias control tracks the threshold knee of the laser, as shown in a typical laser power curve, as it changes with temperature to allow high speed modulation of laser and also minimize droop and crosstalk between dual lasers. The Bias current is not switched ON and OFF with video modulation whereas the Level current is switched On and OFF with video. The Bias is controlled indirectly at a fixed point above the threshold knee to overcome the problem of insufficient light for good feedback where Bias is actually set below threshold. The Bias current being controlled has a fixed LEVEL LOW offset current riding on top with video ON such that by regulating the power of the combination, the LEVEL LOW offset implements a "back off" when the video is actually OFF.

The Level control compensates for change in slope efficiency as it changes with temperature Unlike the Bias control that regulates the output power to an indirect fixed power point, the Level control directly regulates the exposure output to a variable reference byte that implements the ability to change exposure.

The result of the indirect regulation of the Bias at a fixed power point makes available a constant exposure level that is used during SOS detection This provides advantages in two ways. It enables use of lower cost SOS detector circuits that would otherwise need to be insensitive to change in laser power over the full exposure range during detection. It also positional repeatability of SOS detector in sensing the beam which becomes very important when applied to Image on Image (IOI) and micron level color registration especially in a multi-pass system where exposure is changed by large steps when switching colors.

Using a dual beam laser also leads to possible repeatability errors in SOS detection if exposing the SOS with both beams or worse yet alternating between beams. This system implements exposing the SOS with only one beam at the fixed low level provided by the indirect bias control.

Figure 2:
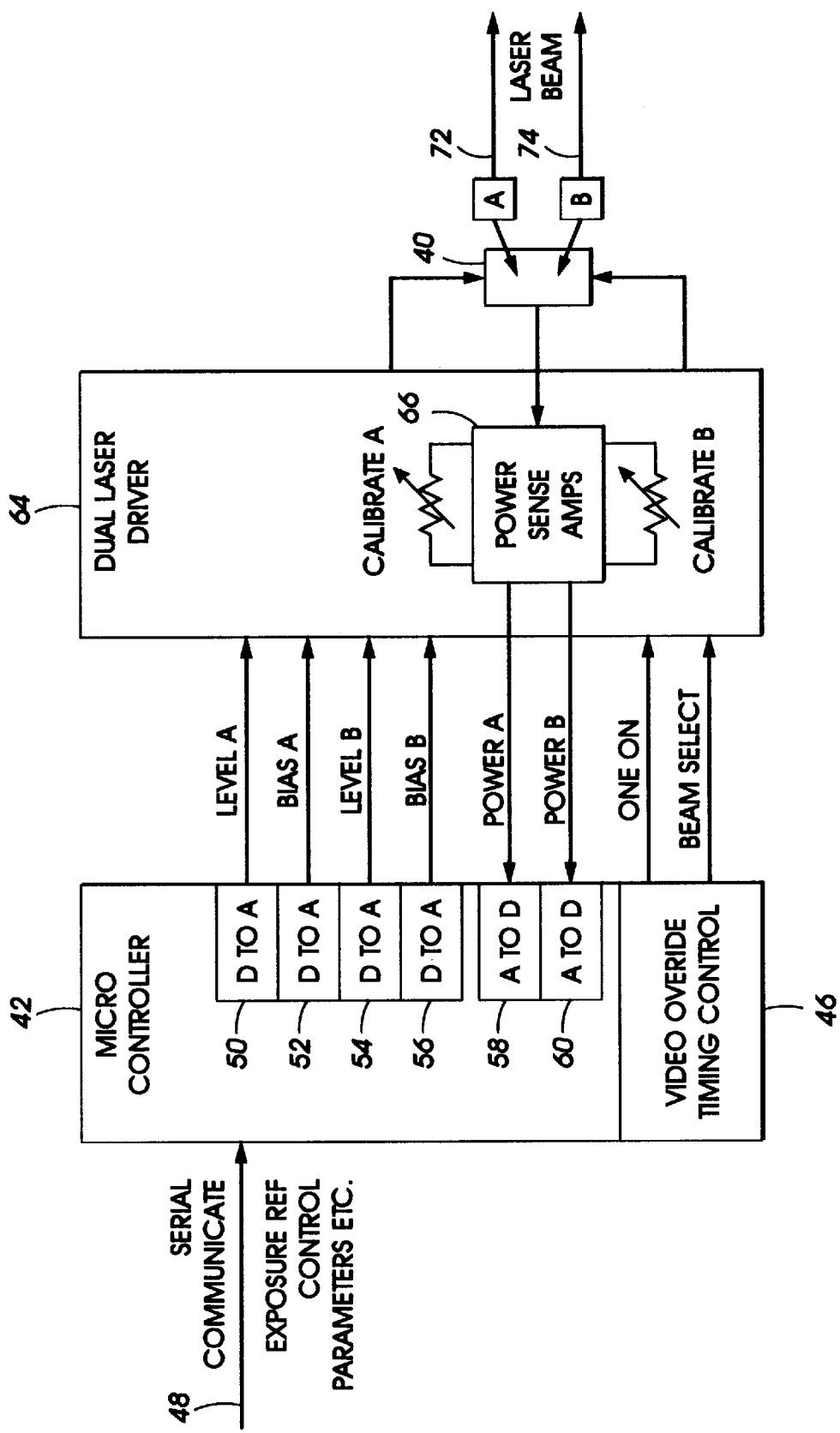
FIG. 2 is a general block diagram of a microprocessor two point power control for a dual laser diode in accordance with the present invention.

With respect to FIG. 2, there is shown a general block diagram of a microprocessor based dual beam two point laser power control in accordance with the present invention, in particular, microcontroller 42 receives serial communications designated at 48 such as laser exposure references and control parameters. Microcontroller 42 also includes suitable digital to analog converters illustrated at 50, 52, 54, and 56 providing control signals to dual laser driver 64 appropriate to level and bias control loops for beams A and B of a dual beam laser. In addition, microcontroller 42 includes analog to digital converters 58 and 60 receiving power A and power B sense signals from power sense amplifier 66. Also, microcontroller provides suitable video override and timing control signals illustrated at 46.

Dual laser driver 64 includes power sense amplifier 66 conveying signals from power sensor 40 to microcontroller 42. The power sensor 40 alternately senses a portion of the laser output power for beam A shown at 72 and beam B shown at 74 to provide the appropriate measure of beam power to microcontroller 42, in turn providing the appropriate level and bias control adjustments to dual driver laser 64.

Figure 3:
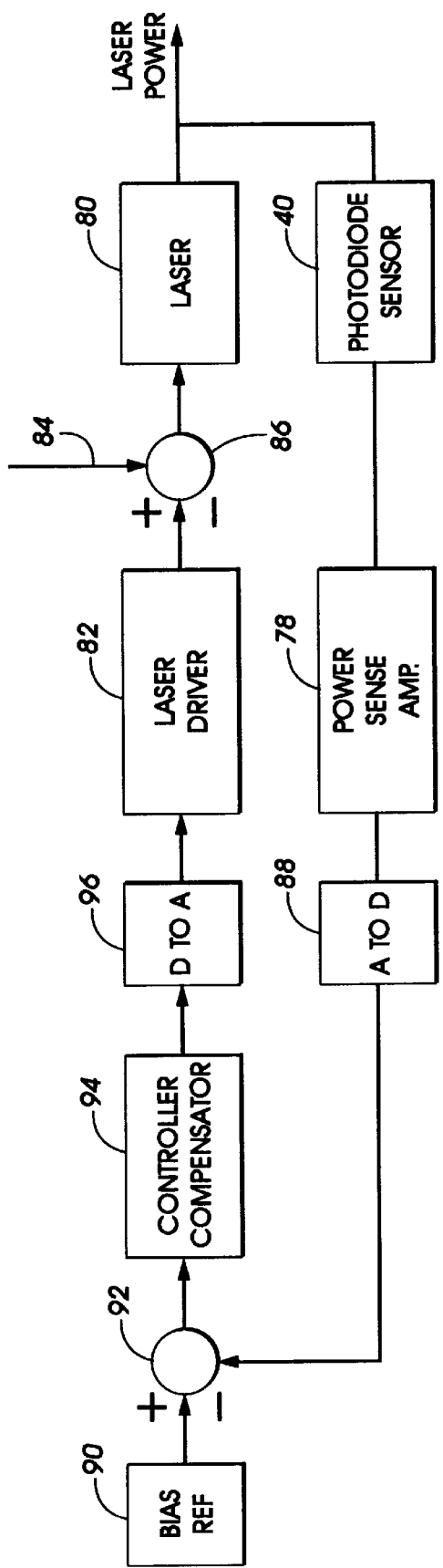
FIGS. 3 and 4 illustrate two concurrent control loops for Exposure On and Exposure Off of the dual laser diode of FIG. 2 in accordance with the sent invention.
Figure 4:
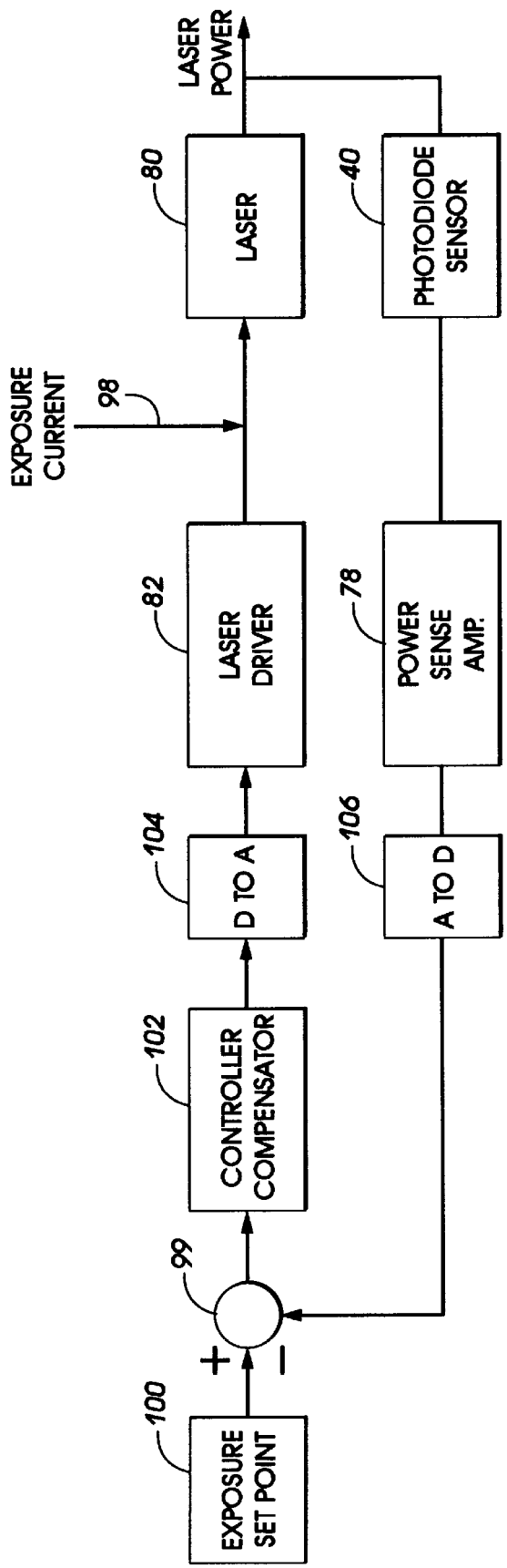

FIGS. 3 and 4 illustrate the bias and level control loops for a given laser beam. With reference to FIG. 3, for bias control laser 80 provides an output beam having a given power. A portion of the output beam, in one embodiment approximately one percent of the output beam, is sensed by photo diode sensor 40 to provide a measure of the output power of the beam. Photo diode sensor 40 conveys a signal representing output power to power sense amplifier 78, in turn providing a signal to analog to digital converter 88. A summing node 92 receives the output of the analog to digital converter 88 as well as a bias reference 90 to provide an error signal to controller compensator 94. The bias reference 90 is an indirect fixed reference related to the OFF exposure of the laser beam. A digital to analog converter 96 converts the signal from the controller compensator 94 to control laser driver 82, a voltage control current source. The output of the laser driver 82, is conveyed to laser 80 with a level low fixed offset current 84 switched in as illustrated at node 86 to indirectly sense bias. This is the bias or OFF exposure control loop.

With reference to FIG. 4, there is shown the ON exposure or level control loop. In particular, photodiode sensor 40 provides a measure of the laser power output from laser 80 conveyed to power sense amplifier 78, to analog to digital converter 106 to summing node 99. A second input to summing node 99 is the exposure set point reference illustrated at 100. Controller compensator 102 via digital to analog converter 104 provides a suitable signal to laser driver 82. The output voltage of the laser driver 82 is responsive to digital to analog converter 104 and exposure current illustrated at 98 to drive laser 80. It should be noted that in both FIGS. 3 and 4 the digital to analog and analog to digital converters, the controller compensators, the summing nodes, and bias control and level control reference signals are preferably included in microcontroller software.

Figure 9:
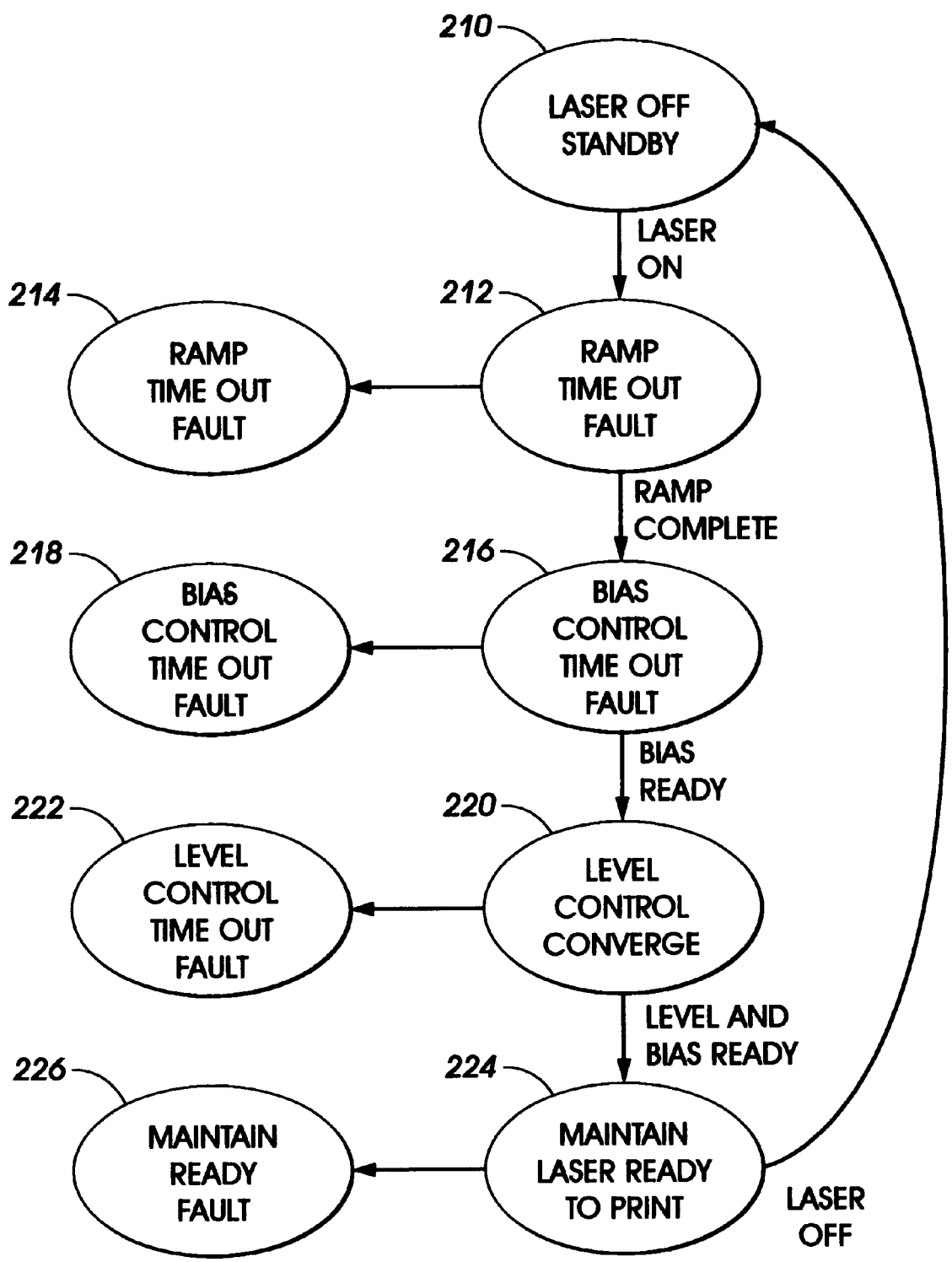
FIG. 9 illustrates the laser power control states in accordance with the present invention.

The laser power control states are generally illustrated in FIG. 9. In particular, the laser OFF standby state is shown at 210, and the laser ON condition initiates a soft start ramp time out shown at 212 with a ramp time out fault illustrated at 214. A ramp complete condition results in a bias control converge state 216 with a bias converge time out fault shown at 218. The bias ready condition results in a level control converge state 220 with a level control time out fault shown at 222. And finally, the level and biased ready condition results in the maintain laser ready to print state shown at 224 with a maintain ready fault shown at 226, and a laser OFF resulting in a return to the laser off standby state 210.

Figure 5:
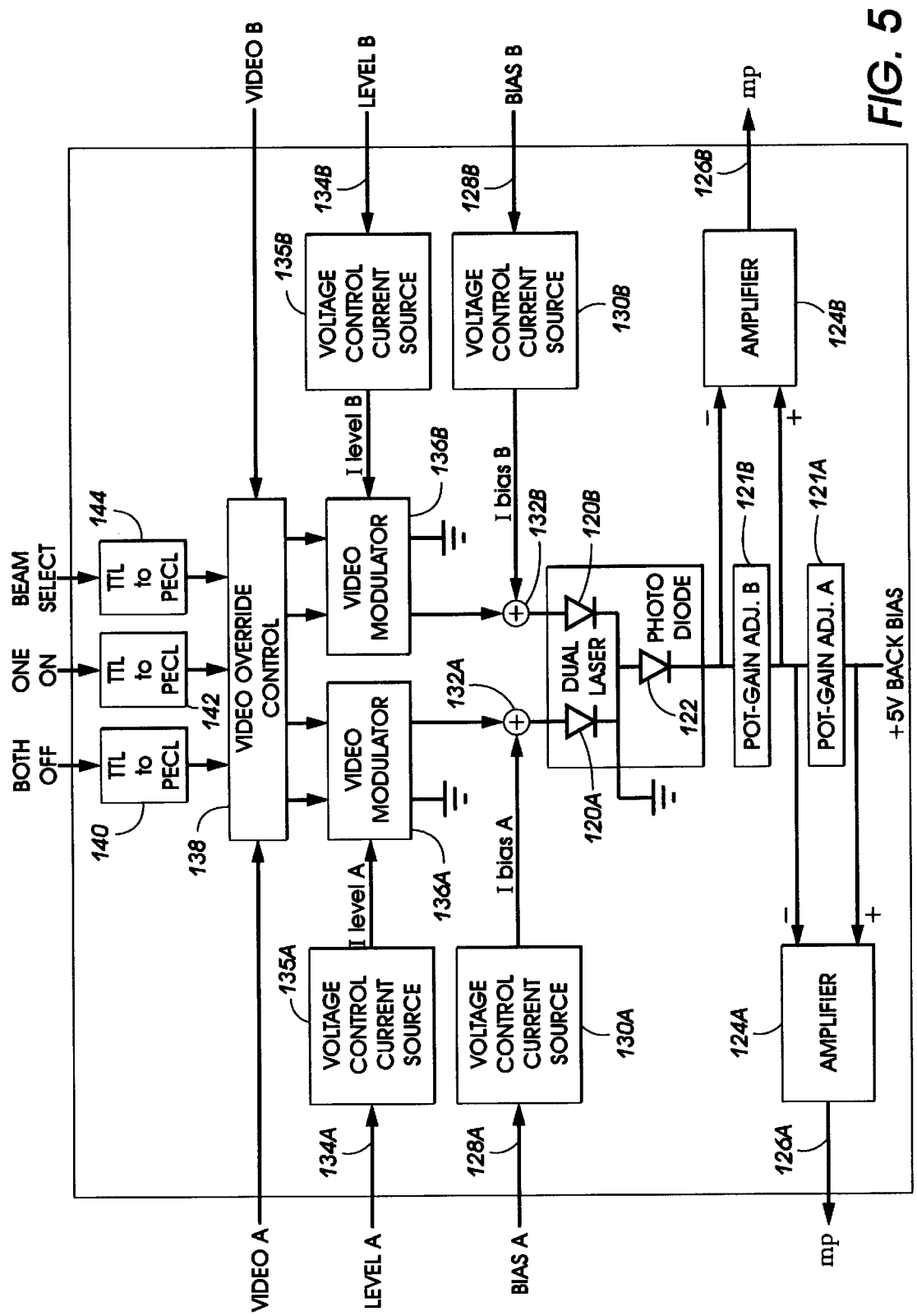
FIG. 5 is a diagram of the laser Driver/Amplifier, Laser Diode, Feedback Photodiode, and Back Facet Amplifier in accordance with the present invention.

FIG. 5 illustrates the laser driver/amplifier, laser diode, feedback photodiode, and back facet amplifier portion of the control loops for dual lasers 120A and 120B with gain adjusts 121A and 121B. Photodiode 122 alternately samples the power from lasers 120A and 120B for feedback to a microprocessor or a digital controller on lines 126A and 126B through amplifiers 124A and 124B. Summing junctions 132A and 132B combine the adjusted bias voltages from the Bias controls 130A and 130B via lines 128A and 128B with the video modulator signals 136A 136B to drive the lasers 120A and 120B. Level A and level B signals 134A, 134B to voltage control current sources 135A and 135B provide input to the video modulators 136A and 136B along with the video signals video A and video B from the video override control 138, in turn responsive to the override selection circuitry 140, 142, and 144.

Figure 6:
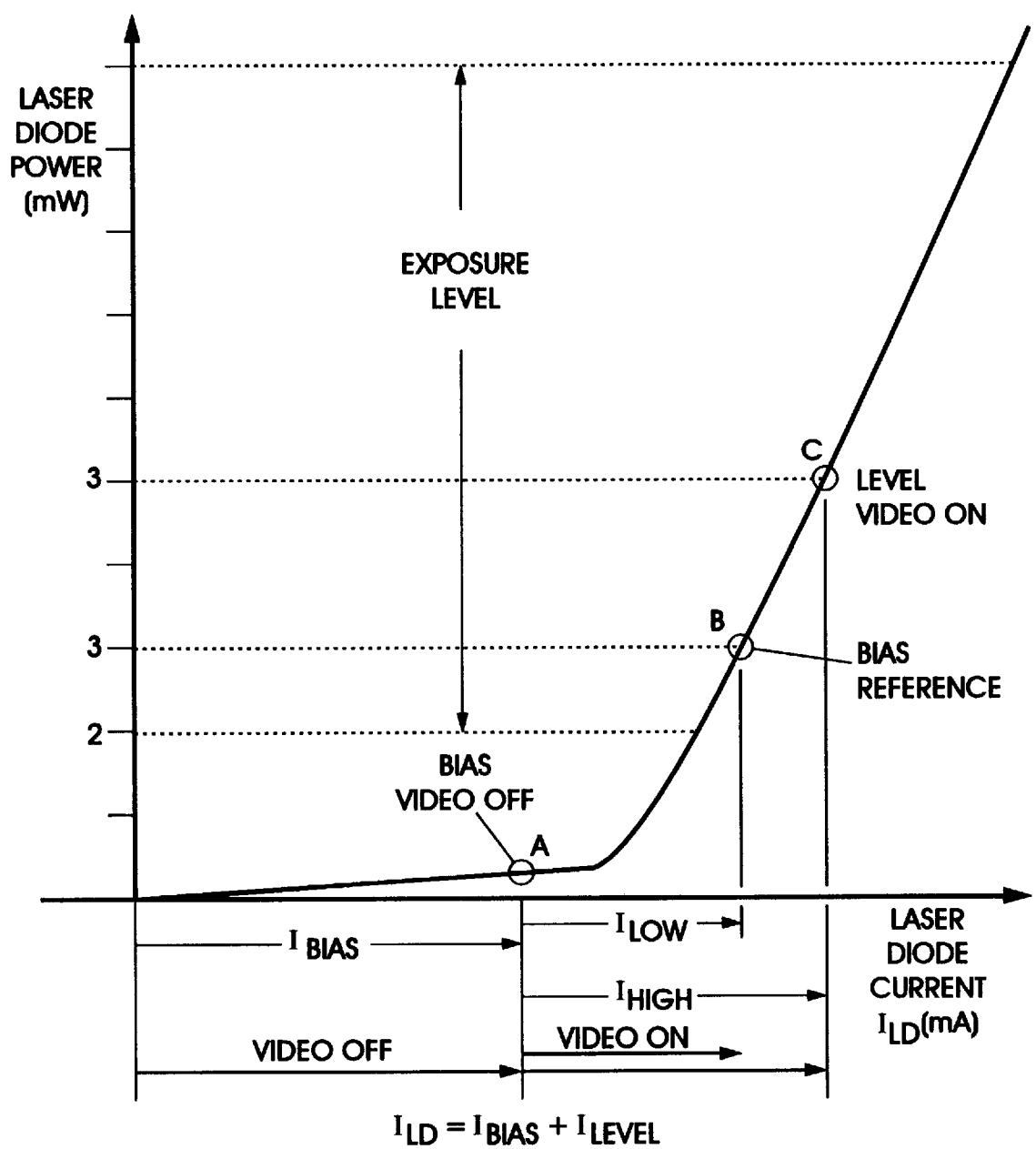
FIG. 6 illustrates a laser diode characteristic curve showing current components in accordance with the present invention.

FIG. 6 illustrates the use of a laser diode characteristic curve in accordance with present invention, in particular illustrating a curve of laser diode power in milliwatts as a function of the laser diode current in milliamps. Point A on the curve, bias control, illustrates the point on the curve of the level of bias current at a video off or background level. Point B, level control, illustrates a bias current reference, that is, an indirect measurement at a fixed power level, also used for start of scan exposure. Point C on the curve represents a power level for video on, in particular an exposure at five milliwatts as a default setting. As shown, there is an exposure level adjustment range from two to ten milliwatts.

The bias current is a variable current controlled by a bias control loop which has a fixed reference. This bias defines the OFF or background point to reside slightly below the lasing threshold knee. The off exposure is controlled by measuring the laser power resulting from both bias current and level low current. Level current is a current that is one of two sources selected by a HIGH, LOW signal on an analog multiplexer depending upon whether bias or level is being controlled. Level low current is a fixed back off current riding on top of BIAS current that implements the indirect measure of the OFF exposure point. High current is a variable current controlled by the LEVEL control loop which has a variable reference that is used to set to ON exposure point.

Figure 7:
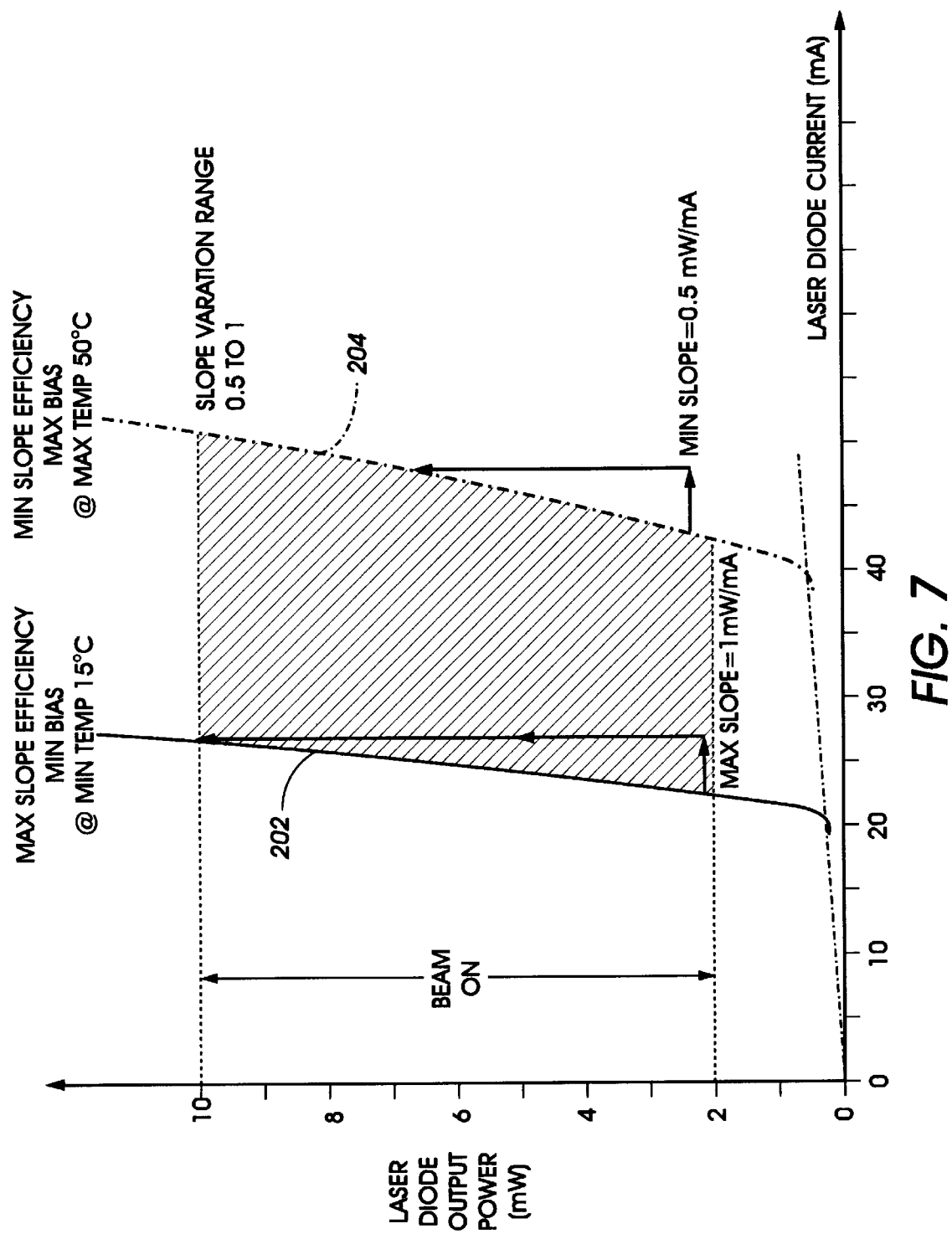
FIG. 7 illustrates a laser diode characteristic curve defining a control range envelope in accordance with the present invention.
Figure 8:
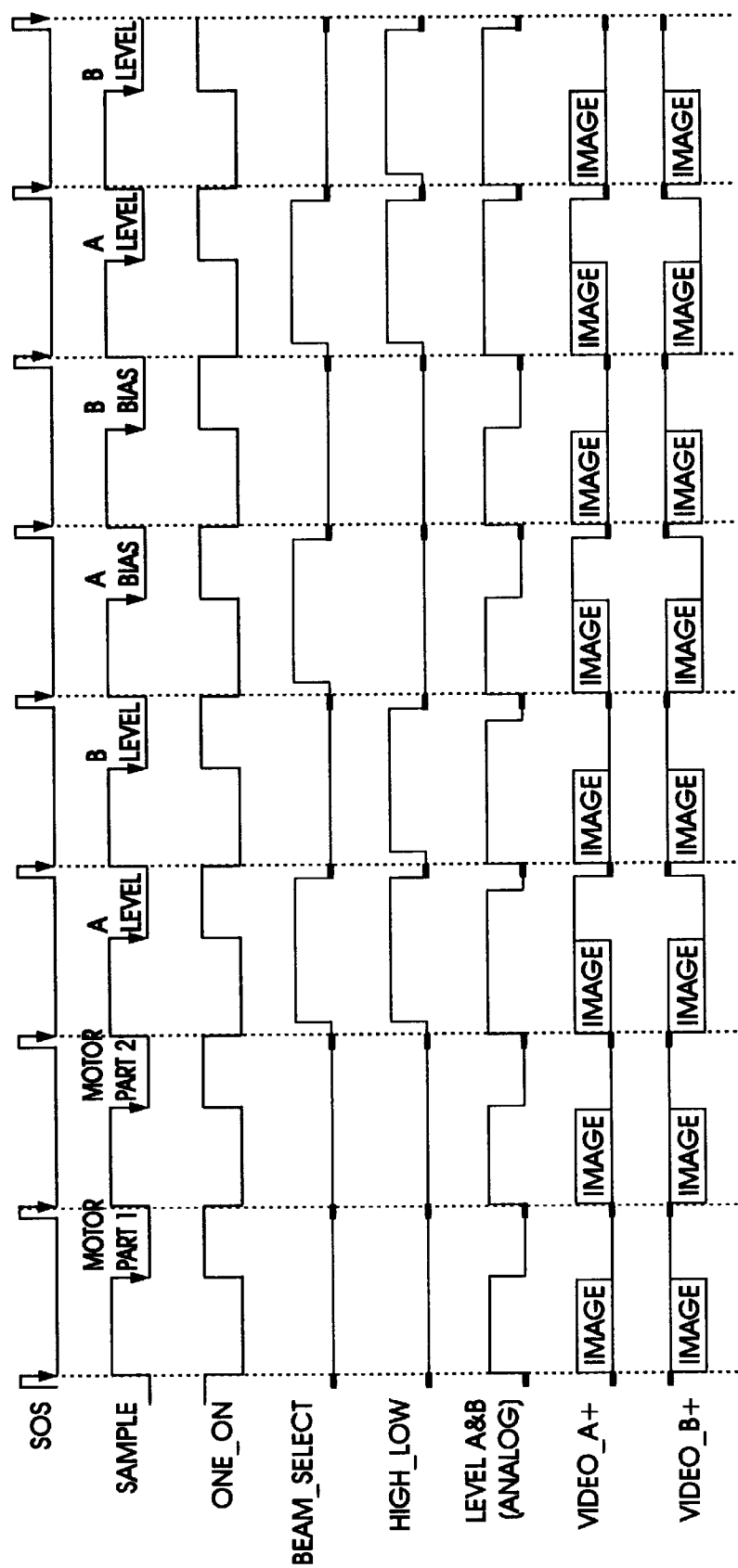
FIG. 8 illustrates a two point power control timing cycle in accordance with the present invention.

FIG. 7 illustrates a typical laser diode characteristic curve defining a control range. Again, laser diode output power in milliwatts is plotted verses laser diode current in milliamps. Curve 202 illustrates a maximum slope efficiency with minimum bias current at a temperature of about 15° centigrade. Curve 204 illustrates a minimum slope efficiency at maximum bias current at a maximum temperature of about 50° centigrade. A threshold knee range is shown between twenty and forty milliamps with a bias control range at 0 to 40 milliamps. FIG. 8 illustrates a time division multiplex of the control loops for a two point power control of dual beam laser power in accordance with the present invention. It also shows time slots for coordinated polygon speed control with the same microprocessor.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. An imaging system for forming image exposure frames on a photoconductive member moving in a process direction including:

a dual laser diode scanner forming a plurality of scan lines in a transverse direction across the width of said member by reflecting modulated beams from a plurality of facets of a rotating polygon, means to digitally control the power from the dual laser diode including, means to control the power from each of the laser diodes for video ON level control, and means to control the power from each of the laser diodes for video OFF bias control.

2. The system of claim 1 including means for detecting the beginning of a scan line and providing a start of scan (SOS) signal representing the detection, and wherein the bias control enables constant exposure power during SOS detection.

3. The system of claim 1 wherein the means to control the power from each of the laser diodes for video ON level control provides dual beam power balance with variable exposure.

4. The system of claim 1 wherein the means to control the power from each of the laser diodes for video OFF bias control provides power balance for background exposure.

5. An imaging system for forming multiple superimposed image exposure frames on a photoconductive member moving in a process direction including:
 a dual laser diode scanner forming a plurality of scan lines in a transverse direction across the width of said member by reflecting modulated beams from a plurality of facets of a rotating polygon,
 means for detecting the beginning of a scan line and providing a start of scan (SOS) signal representing the detection,
 means to digitally control the power from the dual laser diode including,
  means to control the power from each of the laser diodes for video ON level control, and
  means to control the power from each of the laser diodes for video OFF bias control wherein the bias control enables constant exposure power during SOS detection.

6. The system of claim 5 wherein the means to control the power from each of the laser diodes for video ON level control and video OFF bias control provides dual beam power balance.

7. An imaging system for forming image exposure frames on a photoconductive member moving in a process direction including:
 a laser scanner forming a plurality of scan lines in a transverse direction across the width of said member by projecting modulated beams,
 a digital processor electrically connected to the laser scanner for controlling the output power of the laser scanner including;
  video ON logic to control the power from the laser diode for video ON exposure control, and
  video OFF bias logic to control the power from the laser diode for video OFF bias control.

8. The system of claim 7 wherein the digital processor includes sample logic to acquire sampled laser power data.

9. The system of claim 8 wherein the sample logic acquires a power sample between each scan line.

10. The system of claim 7 wherein the video OFF bias logic includes circuitry to set laser power at a fixed threshold point.

11. The system of claim 10 including a sensor for detecting the beginning of a scan line and providing a start of scan (SOS) signal representing the detection.

12. The system of claim 11 wherein the video OFF bias logic provides constant exposure during SOS detection.

13. An imaging system for forming image exposure frames on a photoconductive member moving in a process direction including:
 a laser scanner forming a plurality of scan lines in a transverse direction across the width of said member by projecting modulated beams,
 a digital processor electrically connected to the laser scanner for controlling the output power of the laser scanner including;
  sample logic to acquire sampled laser power data, the sample logic acquiring a power sample between each scan line
  video ON logic to control the power from the laser diode for video ON exposure control, and
  video OFF bias logic to control the power from the laser diode for video OFF bias control, the video OFF bias logic including circuitry to set laser power at a fixed threshold point.

14. The system of claim 13 wherein the sample logic includes high speed capture timing.

15. The system of claim 13 including a sensor for detecting the beginning of a scan line and providing a start of scan (SOS) signal representing the detection.

16. The system of claim 15 wherein the video OFF bias logic provides constant exposure during SOS detection.

17. An imaging system for forming image exposure frames on a photoconductive member moving in a process direction including:
 a laser scanner forming a plurality of scan lines in a transverse direction across the width of said member by projecting modulated beams,
 a sensor for detecting the beginning of a scan line and providing a start of scan (SOS) signal representing the detection,
 a digital processor electrically connected to the laser scanner for controlling the output power of the laser scanner including;
  sample logic to acquire sampled laser power data,
  video ON logic to control the power from the laser diode for video ON exposure control, and
  video OFF bias logic to control the power from the laser diode for video OFF bias control the video OFF bias logic provides constant exposure during SOS detection.

18. The system of claim 17 wherein the video OFF bias logic including circuitry to set laser power at a fixed threshold point.

19. The system of claim 17 wherein the sample logic includes high speed capture timing.

20. In an imaging system for forming image exposure frames on a photoconductive member moving in a process direction, a method for digitally controlling power from a laser diode comprising the steps of:
 reflecting laser diode modulated beams from a rotating polygon,
 forming a plurality of scan lines in a transverse direction across the width of said member,
 digitally controlling power from the laser diode for video ON exposure control, and
 digitally controlling power from the laser diode for video OFF bias control.

21. The method of claim 20 including the steps of detecting the beginning of a scan line and providing a start of scan (SOS) signal representing the detection and enabling constant exposure power during SOS detection.

22. The method of claim 21 wherein the step for controlling the power from the laser diode for video ON exposure control includes the step of providing dual beam power balance with variable exposure.

23. In an imaging system for forming multiple superimposed image exposure frames on a photoconductive member moving in a process direction, a method for digitally controlling power from a dual laser diodes comprising the steps of:
 forming a plurality of scan lines in a transverse direction across the width of said member by reflecting modulated beams from a plurality of facets of a rotating polygon, detecting the beginning of a scan line and providing a start of scan (SOS) signal representing the detection, digitally controlling the power from the laser diodes including the steps of, controlling the power from each of the laser diodes for video ON exposure control, and controlling the power from each of the laser diodes for video OFF bias control wherein the bias control enables constant exposure power during SOS detection.

24. The method of claim 23 wherein the step of controlling the power from each of the laser diodes for video ON exposure control provides dual beam power balance with variable exposure.

25. In an imaging system for forming image exposure frames on a photoconductive member moving in a process direction, a method for digitally controlling power from a laser diode comprising the steps of:

forming a plurality of scan lines in a transverse direction across the width of said member by projecting modulated beams, controlling by a digital processor the output power of the laser scanner including the steps of digitally controlling the power from the laser diode for video ON exposure control, and digitally controlling the power from the laser diode for video OFF bias control.

26. The method of claim 25 wherein the digital processor acquires sampled laser power data.

27. The method of claim 26 wherein the sample logic acquires a power sample between each scan line.

28. The method of claim 25 including the step of high speed capture timing.

29. The method of claim 25 wherein the step of digitally controlling the power from the laser diode for video OFF bias control includes the step of setting laser power at a fixed threshold point.

30. The method of claim 25 including the step of detecting the beginning of a scan line and providing a start of scan (SOS) signal representing the detection.

31. The method of claim 30 wherein the step of digitally controlling the power from the laser diode for video OFF bias control includes the step of providing constant exposure during SOS detection.

* * * * *